Feb. 3, 1931.  J. S. ZOOK  1,790,784
BATTERY
Filed Oct. 6, 1927   2 Sheets-Sheet 1
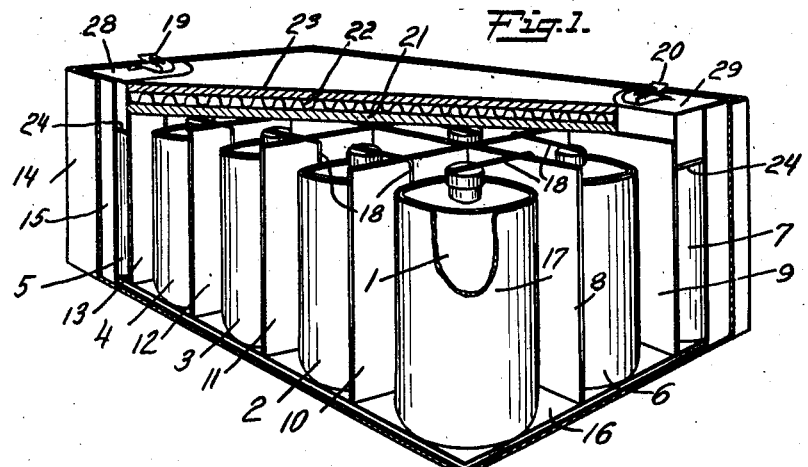
Fig. 1.
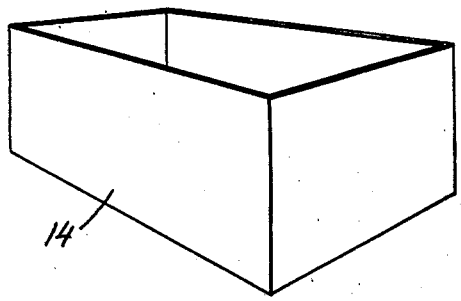
Fig. 2.
Fig. 3.
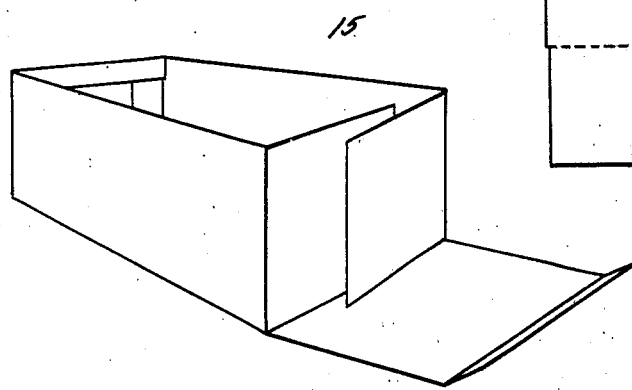
Fig. 4.
Fig. 5.
INVENTOR
John S. Zook
BY
Pennie, Davis, Marvin & Edmonds
ATTORNEYS Feb. 3, 1931.  J. S. ZOOK  1,790,784
BATTERY
Filed Oct. 6, 1927  2 Sheets-Sheet 2
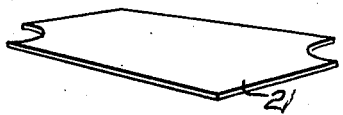
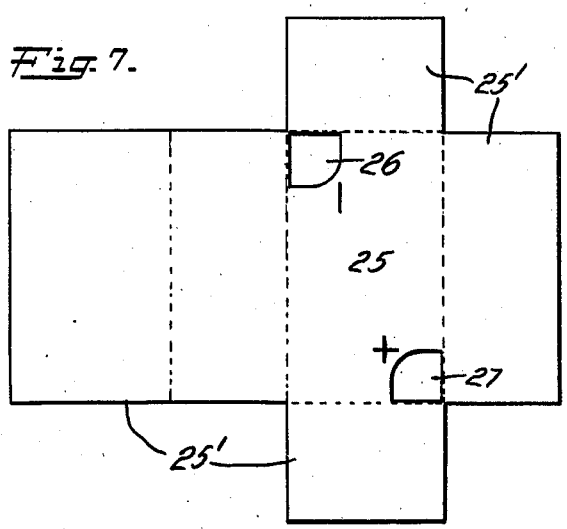
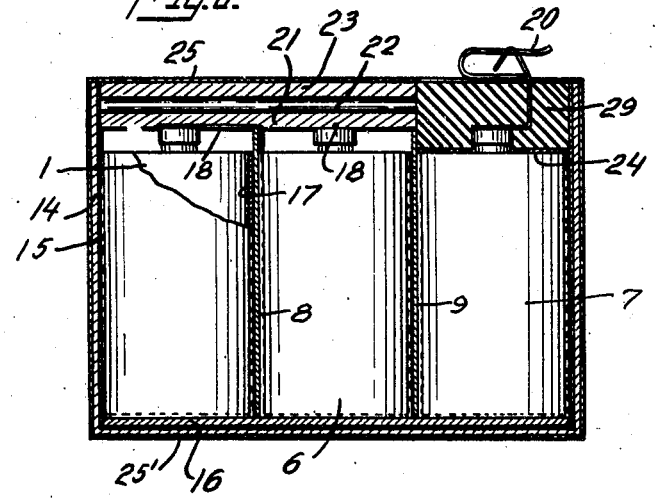
INVENTOR
John S. Zook
BY
Pennie, Davis, Marvin & Edwards
ATTORNEYS Patented Feb. 3, 1931

1,790,784

UNITED STATES PATENT OFFICE

JOHN S. ZOOK, OF MADISON, WISCONSIN, ASSIGNOR TO BURGESS BATTERY COMPANY, OF MADISON, WISCONSIN, A CORPORATION OF WISCONSIN

BATTERY

Application filed October 6, 1927. Serial No. 224,340.

My invention relates to a multiple cell battery of cylindrical dry cells.

It is an object of my invention to provide a multiple cell battery which is light in weight, has a separate sealed compartment for each cell, has the cells and terminals rigidly held, and practically eliminates the use of sealing material in the battery assembly. Other advantages will become apparent in the following specification and drawings in which:

Fig. 1 is a cut away sectional drawing of my battery with the wrapper omitted;

Fig. 2 is a perspective view of the container box;

Fig. 3 is a plan view of the blank of the container box liner;

Fig. 4 is a perspective view of the container in partly assembled condition;

Fig. 5 shows a washer used on top of the terminal cells;

Fig. 6 is a perspective view of a portion of the top closure of the battery;

Fig. 7 is a view of the blank forming the battery wrapping, and,

Fig. 8 is a vertical, transverse, sectional view of the finished battery showing one of the terminal cells.

The battery shown in the drawings consists of a plurality of individual cells 1, 2, 3, 4, 5, 6, and 7 fitted into individual open-ended vertical compartments formed by a nest consisting of interlocking longitudinal and transverse strips 8, 9, 10, 11, 12 and 13. These strips are preferably made of an asphalt saturated paper but may be made of any moisture or zinc chloride resisting sheet material. Individual compartments made in a different manner may also be used. The nest and the cells, at least some of which are electrically connected in series, are enclosed in a closed container which consists of a box 14, Fig. 2 and a closure to be hereinafter described. The box, which is preferably paraffined to resist moisture, is preferably lined with a kraft tar lined paper 15, Figs. 3 and 4.

A sheet of felt 16 impregnated with a fusible water-proof saturant, such as asphalt, covers the bottom of the lined box and acts as a cushion to prevent injury to the cells. The lower edges of the nest rest directly on the felt 16. Preferably a layer of semi-liquid water-repellant cement, such as lap cement, is brushed over the felt so as to seal the joint between the bottom edges of the nest and the felt and thereby provide a tight compartment for the cells. The individual cells may be wrapped in a water-repellant or paraffined saturated paper 17, Fig. 1, as described in Schulte Patent No. 1,408,140 thereby spacing the bottom of the cell from the felt 16. After the cells are connected as desired by connectors 18, and terminals 19 and 20 are in place, the top of the battery is closed. I preferably accomplish this by covering the tops of the strips 8—13 and cells with a sheet of felt 21 impregnated with a fusible water-proof saturant such as asphalt. I preferably heat one side of said felt to fuse the saturant and then press said fused surface onto the cell and partition tops. The felt is thereby firmly fused into place and acts as a top cushioning material for the cells. On top of the felt 21 is placed a backing of single faced corrugated paper 22 or other shock resisting sheet material. This corrugated paper may be fused to the felt 21 before fusing the felt onto the cell tops. A top closure 23 rests on corrugated paper 22, this closure consisting preferably of stock similar to the box 14. The felt 21, corrugated paper 22, and top closure 23 are preferably cut away above the terminal cells 5 and 7 and any other intermediate cells having terminals attached thereto, to expose the tops of said terminal cells. A paper washer 24 may be used over the terminal cells. A wrapper 25, Fig. 7 having cut outs 26 and 27 for leads 19 and 20, is then wrapped tightly around the closed container and glued into place. This wrapper presses the top closure 23 and corrugated paper toward the cell tops and presses felt 21 tightly against the cells. The cell and partition heights must be such that closure 23 will be slightly higher than the sides of the box 14. The wrapper may have printing on it and therefore be made attractive. End flaps 25' on the wrapper may be used to cover the ends of the battery.

After the wrapper is in place, a fusible sealing compound 28 and 29 is poured into the cut out portions 26 and 27 of the felt, corrugated paper, top closure, and wrapper. This sealing material fills the cut out portion and is anchored to the top of the cell. It furthermore anchors the terminal clips or posts firmly so that connections may be readily made without danger of injuring the battery. The resulting battery is a solid unit, light in weight, of neat appearance, and has firmly held terminals.

The above specification describes the preferred method of making the battery. This may be modified in many ways, as by omitting the tar lined kraft from the container, omitting the cement, omitting the felts or the corrugated paper. These omissions and changes will be determined by the quality and cost desired by the manufacturer.

I claim:

1. An electric battery comprising an enclosed container having a water-proof lining at the sides and bottom, a nest fitted therein and consisting of interlocking longitudinal and transverse strips of asphalt saturated sheet material, said strips providing a set of open-ended, vertical compartments, a sheet of felt impregnated with a fusible water-proof saturant covering the bottom sheet of said water-resistant lining on which the lower edges of said longitudinal and transverse strips rest, a layer of lap cement covering said impregnated felt, and sealing the joints between said felt and said strips, dry cells fitting in said compartments, at least some of said cells being electrically connected in series, each cell having a water repellant wrapper spacing it from said impregnated felt, a sheet of felt impregnated with a fusible water-proof saturant covering the tops of said vertical compartments, pressing upon and fused to the upper edges thereof and to the projecting electrodes of said dry cells and rigidly holding said dry cells in said compartments, a backing of single faced corrugated paper fused onto the top of said top impregnated felt, a battery container closure fitting over said corrugated paper, a wrapper enclosing said battery container and rigidly holding and pressing said top closure against said corrugated sheet, said top impregnated felt, corrugated paper, top closure and wrapper being cut away above the terminal cells of said battery, terminals projecting through said cut-outs, and sealing material filling said cut-outs and the space in the compartments above the tops of said terminal cells and about the lower part of said terminals.

2. An electric battery comprising an enclosed container having a water-proof lining at the sides and bottom, a nest fitted therein and consisting of interlocking longitudinal and transverse strips of sheet material treated with a water-repellant substance, said strips providing a set of open-ended, vertical compartments, a sheet of felt impregnated with a fusible water-proof saturant covering the bottom sheet of said water-resistant lining on which the lower edges of said longitudinal and transverse strips rest, a layer of semi-liquid water-repellant cement covering said impregnated felt and sealing the joints between said felt and said strips, dry cells fitting in said compartments, at least some of said cells being electrically connected in series, each cell having a water-repellant wrapper and spacing it from said impregnated felt, a sheet of felt impregnated with a fusible water-proof saturant covering the tops of said vertical compartments, pressing upon the upper edges thereof and the projecting electrodes of said dry cells and rigidly holding said dry cells in said compartments, a backing of single faced corrugated paper on said top impregnated felt, a battery container closure fitting over said corrugated paper, a wrapper enclosing said battery container and rigidly holding and pressing said top closure against said corrugated sheet, said top impregnated felt, corrugated paper, top closure and wrapper being cut away above the terminal cells of said battery, terminals projecting through said cut-outs, and sealing material filling said cut-outs and the space in the compartments above the tops of said terminal cells and about the lower parts of said terminals.

3. An electric battery comprising an enclosed container having a water-proof lining at the sides and bottom, a nest fitted therein and consisting of interlocking longitudinal and transverse strips of sheet material treated with a water-repellant substance, said strips providing a set of open-ended, vertical compartments, a sheet of felt impregnated with a fusible water-proof saturant covering the bottom sheet of said water-resistant lining on which the lower edges of said longitudinal and transverse strips rest, a layer of semi-liquid water-repellant cement covering said impregnated felt and sealing the joints between said felt and said strips, dry cells fitting in said compartments, at least some of said cells being electrically connected in series, a sheet of felt impregnated with a fusible water-proof saturant covering the tops of said vertical compartments, pressing upon the upper edges thereof and the projecting electrodes of said dry cells and rigidly holding said dry cells in said compartments, a backing of corrugated paper on said top impregnated felt, a battery container closure fitting over said corrugated paper, a wrapper enclosing said battery container and rigidly holding and pressing said top closure against said corrugated paper, said top impregnated felt, corrugated paper, top closure and wrapper being cut away above the terminal cells of said battery, terminals projecting through said cut-outs, and sealing material filling said cut-outs and the space in the compartments above the tops of said terminal cells and about the lower parts of said terminals.

4. An electric battery comprising an enclosed container, a nest fitted therein, said nest consisting of interlocking longitudinal and transverse strips of sheet material treated with a water-repellant substance, said strips providing a set of open-ended, vertical compartments, a sheet of cushioning material treated with a water-repellant substance covering the bottom of said container on which the lower edges of said longitudinal and transverse strips rest, a layer of semi-liquid water-repellant cement covering said bottom sheet and sealing the joints between said sheet and said strips, dry cells fitting in said compartments, at least some of said cells being electrically connected in series, a sheet of felt impregnated with a fusible water-proof saturant covering the tops of said vertical compartments, pressing upon the upper edges thereof and the projecting electrodes of said dry cells and rigidly holding said dry cells in said compartments, a backing sheet of cushioning material on said top impregnated felt, a battery container closure fitting over said backing sheet, a wrapper enclosing said battery container and rigidly holding and pressing said top closure against said backing sheet, said top impregnated felt, backing sheet, top closure and wrapper being cut away above the terminal cells of said battery, terminals projecting through said cut-outs, and sealing material filling said cut-outs and the space in the compartments above the tops of said terminal cells and about the lower parts of said terminals.

5. An electric battery comprising an enclosed container, a nest fitted therein, said nest consisting of interlocking longitudinal and transverse strips of water-repellant sheet material, said strips providing a set of open-ended, vertical compartments, a sheet of cushioning material treated with a water-repellant substance covering the bottom of said container on which the lower edges of said longitudinal and transverse strips rest, dry cells fitting in said compartments, at least some of said cells being electrically connected in series, a sheet of cushioning material treated with a water-repellant substance covering the tops of said vertical compartments, pressing upon the upper edges thereof and the projecting electrodes of said dry cells and rigidly holding said dry cells in said compartments, a battery container closure fitting over said top cushioning sheet, a wrapper enclosing said battery container and rigidly holding and pressing said top closure toward said top cushioning sheet, top closure, and wrapper being cut away above the terminal cells of said battery, terminals projecting through said cut-outs, and sealing material filling said cut-outs and the space in the compartments above the tops of said terminal cells and about the lower parts of said terminals.

6. An electric battery comprising an enclosed container, a nest fitted therein, said nest consisting of interlocking longitudinal and transverse strips of water repellant sheet material, said strips providing a set of open-ended, vertical compartments, a sheet of cushioning material treated with a water-repellant substance covering the bottom of said container on which the lower edges of said longitudinal and transverse strips rest, dry cells fitting in said compartments, at least some of said cells being electrically connected in series, a sheet of cushioning material treated with a water repellant substance covering the tops of said vertical compartments, pressing upon the upper edges thereof and the projecting electrodes of said dry cells and rigidly holding said dry cells in said compartments, a battery container closure fitting over said top cushioning sheet, the top surface of said closure being slightly higher than the top edges of the sides of said container and a wrapper completely enclosing said battery container rigidly holding and pressing said top closure toward said top cushioning sheet.

7. An electric battery comprising an enclosed container containing a plurality of cells each of which is located in a separate vertical compartment, a sheet of cushioning material treated with a water-repellant substance covering the tops of said vertical compartments, pressing upon the upper edges thereof and the projecting electrodes of said dry cells and rigidly holding said dry cells in said compartments, a battery container closure fitting over said top cushioning sheet, a wrapper enclosing said battery container and rigidly holding and pressing said top closure against said cushioning sheet, said top cushioning sheet, top closure, and wrapper being cut away above the terminal cells of said battery, terminals projecting through said cut-outs, and sealing material filling said cut-outs and the space in the compartments about the tops of said terminal cells and about the lower part of said terminals.

8. An electric battery comprising an enclosed container containing a plurality of cells each of which is located in a separate vertical compartment, a battery container closure fitting over the tops of said cells, a wrapper enclosing said battery container and rigidly holding and pressing said closure toward said cells, and fusible seals above the tops of the terminal cells of said battery extending to the surface of said container through cut-outs therein above said terminal cells, the terminals being anchored in said fusible seals.

9. An electric battery comprising an enclosed container containing a plurality of cells, a wrapper enclosing said battery container and exerting sufficient pressure inwardly on said container to hold said cells rigidly in place, and fusible seals above the tops of the terminal cells of said battery extending to the surface of said container through cut-outs therein above said terminal cells, the terminals being anchored in said fusible seals.

10. An electric battery comprising an enclosed container containing a plurality of cells each of which is located in a separate vertical compartment, a battery container closure fitting over the tops of said cells, a wrapper enclosing said battery and exerting sufficient pressure inwardly on said container to hold said cells rigidly in place and fusible seals above the tops of the terminal cells of said battery extending to the surface of said container through cut-outs therein above said terminal cells, the terminals being anchored in said fusible seals.

11. An electric battery comprising an enclosed container containing a plurality of cells, said cells including terminal cells and intermediate cells, said container being provided with spaced cut-outs arranged over the terminal cells, fusible seals in said cut-outs and anchored to the terminal cells, said seals being separated from each other by the portion of the container between the cut-outs, and battery terminals extending through said fusible seals to said terminal cells.

12. An electric battery comprising an enclosed container, a plurality of cells in said container, said cells including terminal cells and intermediate cells, said container being provided with spaced cut-outs, fusible seals in said cut-outs, said seals being separated from each other by the portion of the container between the cut-outs, and terminals extending through said fusible seals to the terminal cells of said battery.

In testimony whereof I affix my signature.

JOHN S. ZOOK.